(12) United States Patent
Gruber et al.

(10) Patent No.: US 11,945,734 B2
(45) Date of Patent: Apr. 2, 2024

(54) FILTER DEVICE

(71) Applicant: Egon Gruber, Graz (AT)

(72) Inventors: Egon Gruber, Graz (AT); Rene Orgel-Zechner, Leibnitz (AT)

(*) Notice: Subject to any disclaimer, the term of this patent is extended or adjusted under 35 U.S.C. 154(b) by 180 days.

(21) Appl. No.: 15/559,316

(22) PCT Filed: Mar. 17, 2016

(86) PCT No.: PCT/AT2016/050065
§ 371 (c)(1),
(2) Date: Sep. 18, 2017

(87) PCT Pub. No.: WO2016/145471
PCT Pub. Date: Sep. 22, 2016

(65) Prior Publication Data
US 2018/0111849 A1    Apr. 26, 2018

(30) Foreign Application Priority Data
Mar. 19, 2015 (AT) .............................. A 50223/2015

(51) Int. Cl.
*C02F 1/28* (2023.01)
*B01D 15/00* (2006.01)
(Continued)

(52) U.S. Cl.
CPC .............. *C02F 1/285* (2013.01); *B01D 15/00* (2013.01); *B01D 24/24* (2013.01); *C02F 2103/20* (2013.01); *C02F 2103/42* (2013.01)

(58) Field of Classification Search
CPC .................. C02F 1/285; C02F 2103/20; C02F 2103/42; B01D 15/00; B01D 24/22; B01D 24/24;
(Continued)

(56) References Cited

U.S. PATENT DOCUMENTS 2,874,847 A * 2/1959 Diamond ............... B01J 47/022
                                                   210/291
4,102,790 A   7/1978 Portyrata et al.
(Continued)

FOREIGN PATENT DOCUMENTS

CA         1300036      5/1992
CN       203196403      9/2013
(Continued)

OTHER PUBLICATIONS

Austria Search Report conducted in counterpart Austria Appln. No. A 50223/2015 (Sep. 3, 2015).

*Primary Examiner* — Akash K Varma
(74) *Attorney, Agent, or Firm* — GREENBLUM & BERNSTEIN, P.L.C.

(57) ABSTRACT

A filter device having a filter housing (1) for a filter medium formed from fibrous material (2), wherein the filter housing (1) has an inlet for liquid to be filtered and a suction opening (8) for the filtered liquid, in which it is proposed that the filter housing (1) is divided by means of an internal partition plate (4), which is provided with passage openings (11) for the liquid, into a suction-side prechamber (5) and an inlet-side filter chamber (6), wherein the prechamber (5) has a cross section which is widened in comparison to the suction opening (8) or widens from the suction opening (8) to the partition plate (4), and the filter chamber (6) is filled using the filter medium formed from fibrous material (2) and has the inlet. The filter chamber (6) enables a reliable and dimensionally stable receptacle for the fibrous material (2), wherein the risk of compression and compaction of the filter medium is reduced with the aid of the embodiment according to the invention.

3 Claims, 5 Drawing Sheets

Figure 4:
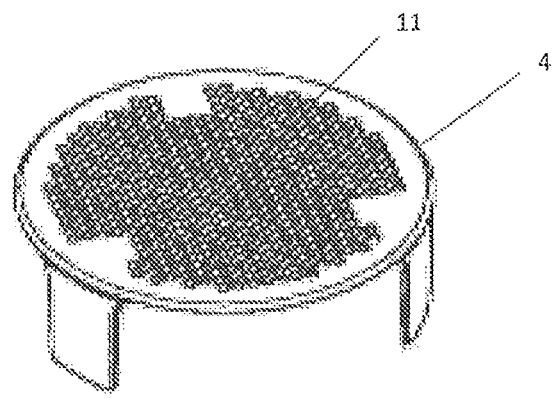
Figure 5:
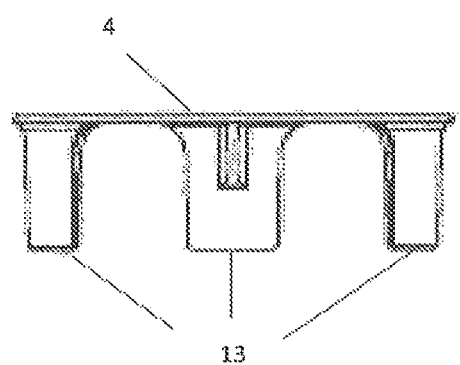

(51) Int. Cl.
B01D 24/24 (2006.01)
*C02F 103/20* (2006.01)
*C02F 103/42* (2006.01)

(58) Field of Classification Search
CPC ................ B01D 29/0027; B01D 39/04; B01D 39/1653; B01D 24/10
USPC .......................... 210/282, 293, 416.1, 416.2
See application file for complete search history.

(56) References Cited

U.S. PATENT DOCUMENTS

| | | | |
|---|---|---|---|
| 4,627,118 A * | 12/1986 | Baker | .................... B01D 24/14 210/106 |
| 6,090,284 A | 7/2000 | Melber et al. | |
| 6,261,453 B1 | 7/2001 | Savage | |
| 2001/0032813 A1 | 10/2001 | Savage | |
| 2007/0007192 A1 | 1/2007 | Worrell | |
| 2007/0062870 A1 * | 3/2007 | Chen | .................... B01D 65/108 210/636 |
| 2007/0175832 A1 | 8/2007 | Roberts | |
| 2014/0202949 A1 * | 7/2014 | Lai | ........................ B01D 15/00 210/266 |
| 2014/0374331 A1 * | 12/2014 | Anderson | ............. B01D 29/13 210/416.1 |

FOREIGN PATENT DOCUMENTS

| | | |
|---|---|---|
| DE | 3240615 | 5/1984 |
| JP | 2013078713 A * | 5/2013 |
| WO | 96/38387 | 12/1996 |
| WO | 97/40907 | 11/1997 |
| WO | 2008/033584 | 3/2008 |

* cited by examiner

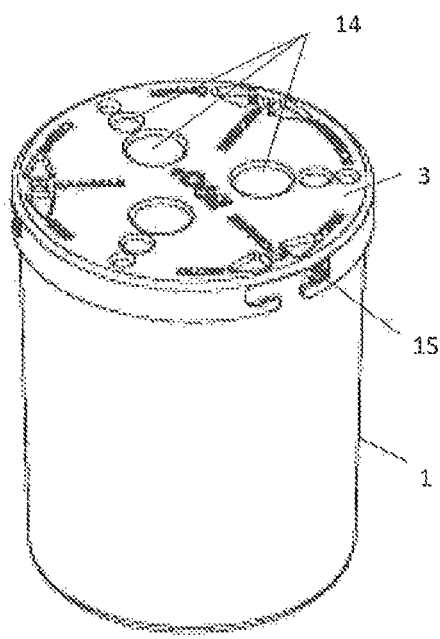
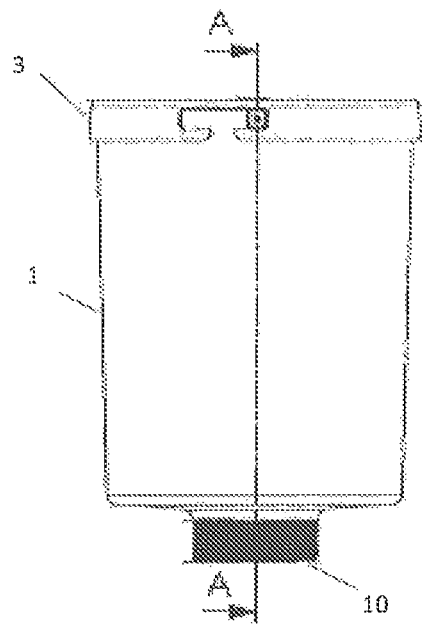
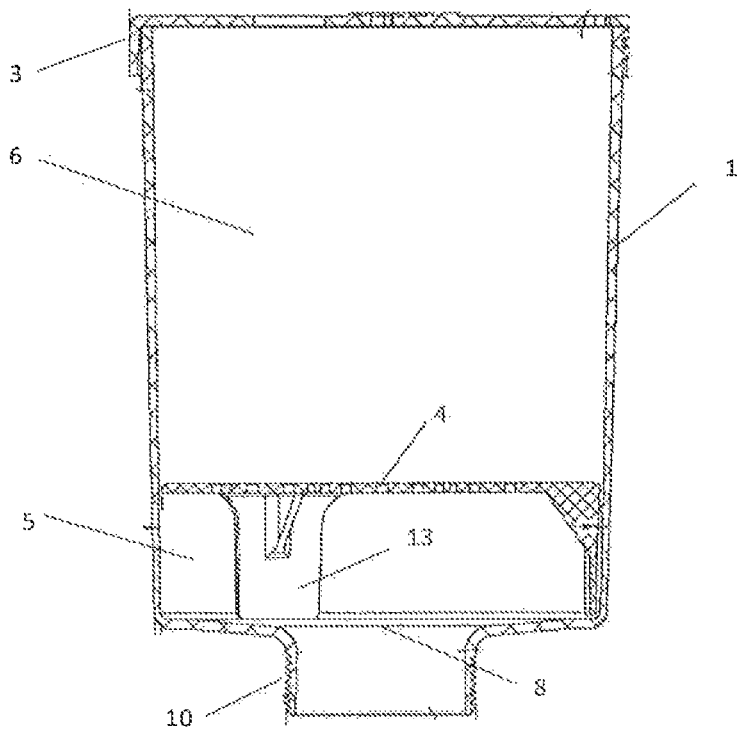

FILTER DEVICE

The invention relates to a filter device having a filter housing for a filter medium formed from fibrous material, wherein the filter housing has an inlet for a liquid to be filtered and a suction opening for the filtered liquid, according to the preamble of Claim 1.

Filter devices of the type mentioned are used in particular for aquariums, swimming ponds, swimming pools, or whirlpools. Above all, sand filters or cartridge filters are conventionally used in this case. however, a novel filter medium in the form of fibrous material has also been proposed. These are, for example, compressed plastic fibers in the form of small balls, having different surface structures and cross sections, which have a high absorbency for dirt particles and floating particles. Such a filter medium enables a nearly unpressurized filtration having a pressure loss during the filtration of a few millibar. A disadvantage of this filter medium is, however, that compression or compaction of the fibrous material can easily occur in the course of use, whereby the depth filter action can be significantly reduced. The filter medium is thereafter compacted to form a planar filter having low absorbency and has to be replaced relatively rapidly.

It is therefore the object of the invention to provide a filter device, which enables reliable operation using a filter medium formed from fibrous material and which extends the duration of use of this filter medium.

This object is achieved by the features of Claim 1. Claim 1 relates to a filter device having a filter housing for a filter medium formed from fibrous material, wherein the filter housing has an inlet for liquid to be filtered and a suction opening for the filtered liquid, and in which it is proposed according to the invention that the filter housing is divided by means of an internal partition plate, which is provided with passage openings for the liquid, into a suction-side prechamber and an inlet-side filter chamber, wherein the prechamber has a cross section which is widened in comparison to the suction opening or which widens from the suction opening to the partition plate, and the filter chamber is filled using the filter medium formed from fibrous material and has the inlet.

The filter chamber forms a reliable and dimensionally stable receptacle for the fibrous material in this case. The suction opening is connected to a pump, which ensures a suction action in the suction opening and causes a liquid flow within the filter housing from the inlet to the suction opening. To reduce the flow pressure on the fibrous material and to wash the liquid flowing inside the filter housing from the inlet to the suction opening around the fibrous material in a gentle manner, a suction-side prechamber is furthermore provided, which has a cross section which is widened in comparison to the suction opening or which widens from the suction opening to the partition plate. The suction action of the suction opening is reduced in the filter housing in this manner. The reduced suction thereafter spreads over the prechamber and the passage openings of the partition plate into the filter chamber and from there to the inlet of the filter chamber, where the liquid to be filtered is suctioned from the exterior of the filter housing. For this purpose, for example, inlet openings forming the inlet are provided in a cover of the filter chamber, through which the liquid to be filtered is suctioned into the filter chamber, where it flows through the filter medium formed from fibrous material. The cover is preferably embodied as removable, so that the filter medium can be replaced as needed.

The partition plate can be embodied, for example, so that it is insertable into the filter housing and is supported via spacers on the bottom plate of the filter housing. According to a further embodiment, however, it can also be provided that the partition plate forms a cover surface, provided with passage openings, for a pipe piece which opens into the suction opening and traverses the prechamber, and which is supported on the bottom plate and the lateral surface of which has apertures opening into the prechamber. In this case, the pipe piece represents the spacer for the partition plate. The filter chamber having the filter medium is therefore connected via the pipe piece to the suction opening, so that the liquid to be filtered is suctioned from the suction opening via the pipe piece and the passage openings of the cover surface from the filter chamber. However, since the lateral surface of the pipe piece is provided with apertures, the filtered liquid is also suctioned into the prechamber via passage openings of the partition plate located outside the cover surface. The suction pressure existing in the filter chamber is therefore reduced again, but the suction opening does not widen suddenly to the cross section of the prechamber, but rather initially continues substantially unchanged in the pipe piece, wherein the apertures in the lateral surface of the pipe piece ensure a continuously decreasing flow pressure in the axial direction.

However, it would also be conceivable to embody the prechamber in the form of a truncated cone having a cross section widening from the suction opening to the partition plate. A continuously decreasing flow pressure in the axial direction can also be achieved in this manner.

To optimize the flow conditions and enable a particularly simple construction, a rotationally-symmetrical embodiment is preferably proposed, by embodying the filter housing as cylindrical and embodying the partition plate as an insert disk, which divides the filter housing into a cylindrical prechamber and a cylindrical filter chamber, wherein the suction opening is arranged in a bottom plate of the filter housing and the inlet is arranged on the side of the filter chamber facing away from the bottom plate. If an inserted pipe piece is used for such a rotationally-symmetrical embodiment, the pipe piece preferably extends coaxially in relation to the cylinder axis of the filter housing.

Figure 6:
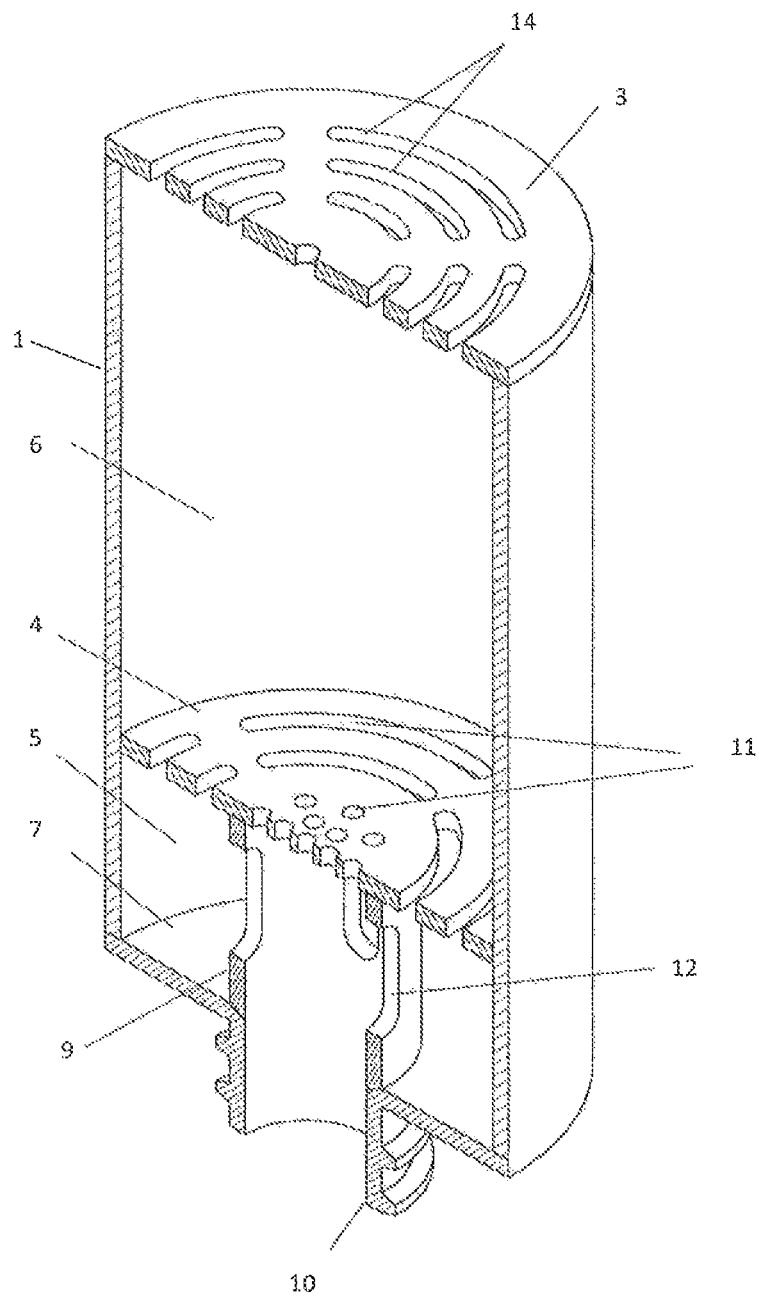
Figure 7:
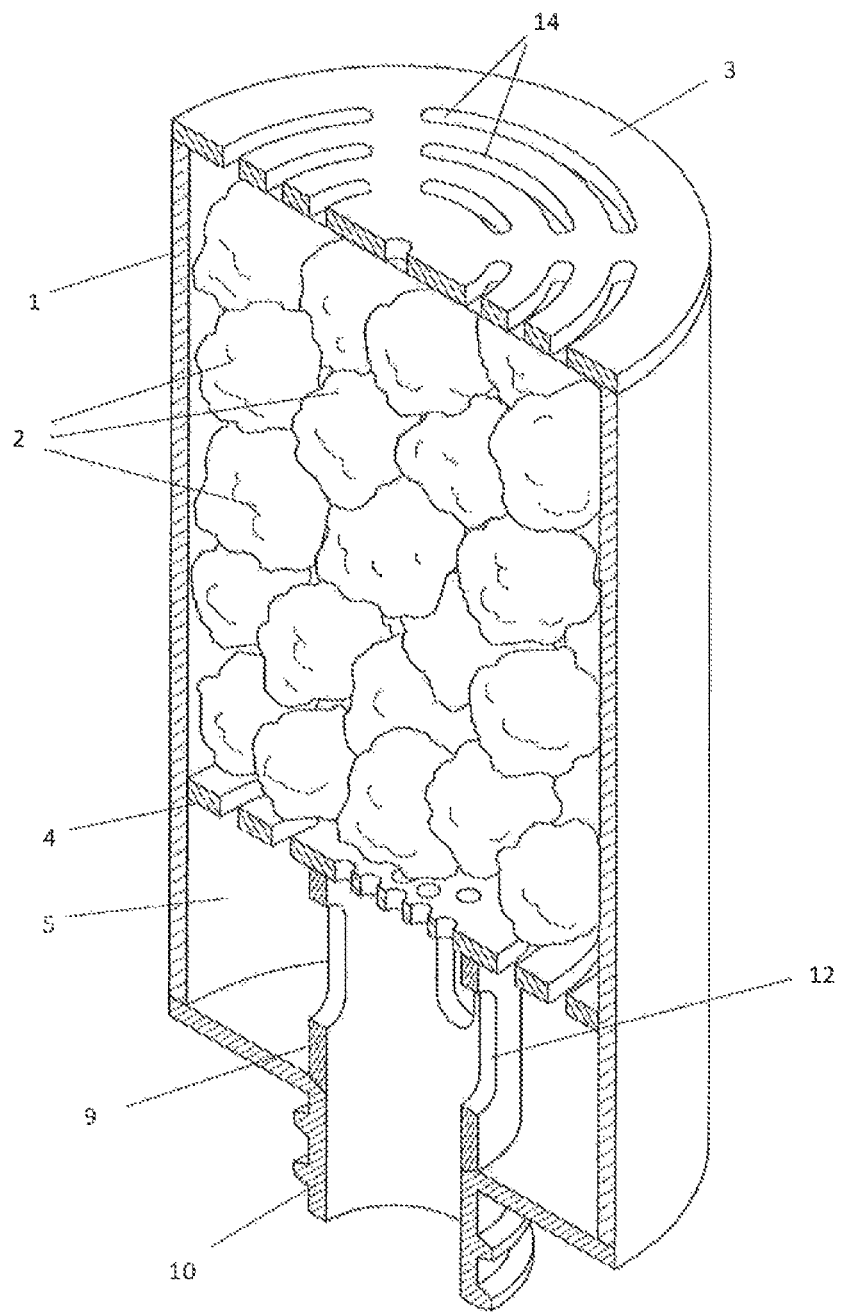
Figure 8:
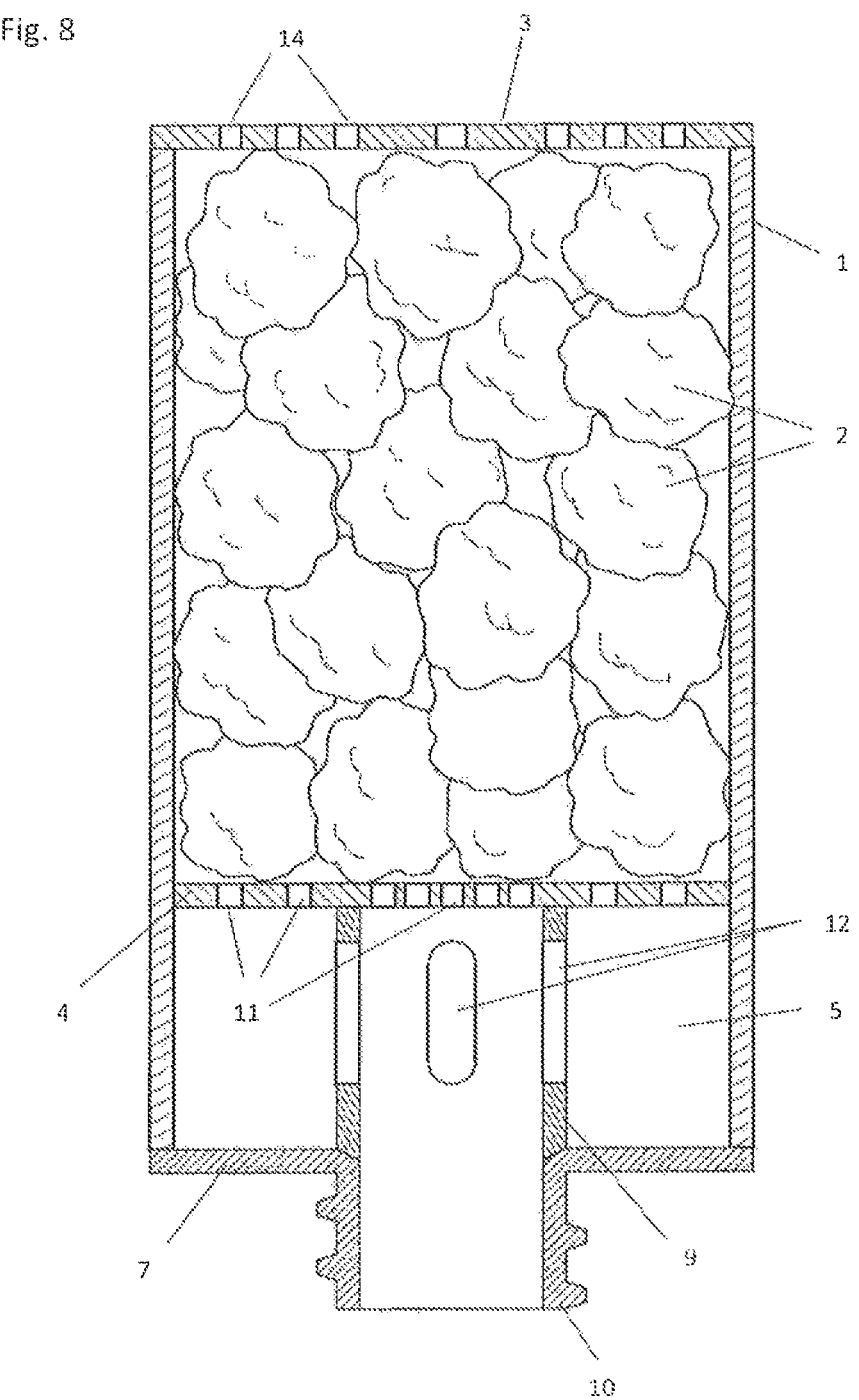

The invention will be explained in greater detail hereafter on the basis of exemplary embodiments with the aid of the appended figures. In the figures:

FIG. 1 shows a perspective view of an embodiment of a filter device according to the invention, FIG. 2 shows a side view of the embodiment according to FIG. 1 with indicated section plane A-A, FIG. 3 shows a sectional view according to section plane A-A of FIG. 2 without filter medium, FIG. 4 shows a perspective view of the partition plate for an embodiment according to FIGS. 1-3, FIG. 5 shows a side view of the partition plate according to FIG. 4, FIG. 6 shows a perspective sectional view of a further embodiment of a filter device according to the invention without filter medium, FIG. 7 shows a perspective sectional view of the filter device according to FIG. 6 with filter medium, and FIG. 8 shows a sectional view of the filter device according to FIG. 7.

Firstly, a first embodiment of a filter device according to the invention will be explained on the basis of FIGS. 1 to 5. In the embodiment shown, the filter housing 1 is embodied as cylindrical and has a cover 3, which is provided with inlet openings 14. The inlet openings 14 form the inlet of the filter housing 1 and can vary in shape, number, and size. The cover 3 is preferably embodied as removable with the aid of a closure device 15, so that the filter medium 2 located inside the filter housing 1 can be replaced as needed. FIG. 2 shows a side view of the filter housing 1, wherein the attachment flange 10 of the filter device according to the invention is visible, which is located on the side of the filter housing 1 facing away from the cover 3. A pump, which suctions the filtered liquid, can be attached to the attachment flange 10. The attachment flange 10 can be provided with an external thread for this purpose, for example.

FIG. 3 shows a sectional view along section plane A-A of FIG. 2 without filter medium. A partition plate 4, which is embodied in a disk shape and presses leak-tight against the inner housing jacket, is arranged in the interior of the filter housing 1. The partition plate 4 is insertable into the filter housing 1 and has spacers 13 protruding from the partition plate 4, as is also visible in FIGS. 4 and 5 in particular. FIG. 4 shows a perspective view of the partition plate 4 for an embodiment according to FIGS. 1-3, and FIG. 5 shows a side view of the partition plate according to FIG. 4. With the aid of the spacers 13, the partition plate 4 inserted into the filter housing 1 is supported by a bottom plate 7 of the filter housing 1. In this manner, the inner chamber of the filter housing 1 is divided to a suction-side prechamber 5 and an inlet-side filter chamber 6. The filter medium in the form of loosely laid fibrous material 2, which is not shown in FIG. 3, is located in the filter chamber 6.

The attachment flange 10 arranged on the bottom plate 7 opens via a suction opening 8 into the prechamber 5. The flow pressure of the liquid to be filtered through the filter device according to the invention is generated, as already noted, via a pump, which is not shown in FIGS. 1-8. The suction generated with the aid of the pump in the suction opening 8 spreads thereafter via the prechamber 5 and the passage openings 11 of the partition plate 4 into the filter chamber 6 and from there to the inlet of the filter chamber 6, where the liquid to be filtered is suctioned from the exterior of the filter housing 1. For this purpose, inlet openings 14 forming the inlet are provided in a cover 3 of the filter chamber 6, through which the liquid to be filtered is suctioned into the filter chamber 6, where it flows through the filter medium formed from fibrous material 2.

In the course of operation of the filter device according to the invention, the liquid to be filtered firstly flows via the inlet openings 14 into the filter chamber 6. After the passage of the liquid to be filtered through the filter medium of the filter chamber 6, the filtered liquid thereafter leaves the filter chamber 6 via the passage openings 11 of the partition plate 4 and enters the prechamber 5. The filtered liquid collected in the prechamber 5 finally leaves the filter housing 1 via the suction opening 8. The flow pressure increases strongly upon the passage from the prechamber 5 into the suction opening 8 due to the narrowing cross section. However, this increase does not have disadvantageous effects on the fibrous material 2, because it is kept away from this region with the aid of the partition plate 4. In other words, the prechamber 5 reduces the flow pressure on the fibrous material 2 located in the filter chamber 6, because the flow cross section enlarges because of the widened cross section of the prechamber 5 in comparison to the suction opening 8. The liquid to be filtered therefore washes gently over the fibrous material 2.

A second embodiment of the filter device according to the invention will be explained on the basis of FIGS. 6 to 8. A partition plate 4 is again provided, which is embodied as a partition disk and presses leak-tight against the inner housing jacket of the cylindrically embodied filter housing 1. In this manner, the filter housing 1 is again divided into a prechamber 5 and a filter chamber 6, which are also each cylindrical. A suction opening 8 for the liquid to be filtered is located in a bottom plate 7 of the filter housing 1. However, the suction opening 8 opens into a pipe piece 9, which is arranged inside the prechamber 5 and traverses the prechamber 5, wherein it is supported on the bottom plate 7. The pipe piece 9 has a cross section in the embodiment shown which substantially corresponds to that of the suction opening 8, however, it could also be embodied so that it has a cross section which widens from the suction opening 8 to the partition plate 4. The orifice of the pipe piece 9 facing away the suction opening 8 is covered by the partition plate 4. The partition plate 4 therefore forms a cover surface for the pipe piece 9, but also has passage openings 11 in this region, via which the filtered liquid can flow from the filter chamber 6 into the pipe piece 9. The lateral surface of the pipe piece 9 furthermore has apertures 12, via which filtered liquid can flow from the prechamber 5 into the pipe piece 9 and therefore further to the suction opening 8. The apertures 12 in the lateral surface of the pipe piece 9 are embodied in the exemplary embodiment shown as axially extending slots, however, they can also be embodied differently in shape, number, and size, to respectively optimize the flow and pressure conditions. The liquid located in the filter chamber 6 can also flow via passage openings 11 of the partition plate 4 located outside the cover surface into the prechamber 5. The pipe piece 9 ensures spacing of the partition plate 4 apart from the bottom plate 7 and could also be formed onto the partition plate 4, so that an insert body is formed, which is supported via the pipe piece 9 on the bottom plate 7.

In the embodiment according to FIGS. 1 to 5 and according to FIGS. 6 to 8, the filter chamber 6 is used in each case to accommodate the filter medium formed from fibrous material 2, as is apparent on the basis of FIGS. 7 and 8. In the example shown, the fibrous material 2 is, for example, compacted polyester fibers in the form of small balls.

In the course of operation of the filter device according to the invention, the liquid to be filtered flows via the inlet openings 14 into the filter chamber 6. After the passage of the liquid to be filtered through the filter medium of the filter chamber 6, the filtered liquid thereafter leaves the filter chamber 6 via the passage openings 11 of the partition plate 4 and either enters the pipe piece 9 directly, or enters the prechamber 5 via passage openings 11 located outside the cover surface of the pipe piece 9, from where it flows via the apertures 12 into the pipe piece 9. The suction within the pipe piece 9 is continuously reduced in this manner from the suction opening 8 to the partition plate 4, a sudden reduction of the flow pressure is avoided, however. The flow pressure on the fibrous material 2 is again reduced, so that the liquid to be filtered washes gently around the fibrous material 2.

The filter chamber 6 enables a reliable and dimensionally stable receptacle for the fibrous material 2, wherein the risk of compression and compaction of the filter medium is reduced with the aid of the embodiment according to the invention. The filter device according to the invention therefore enables reliable operation using a filter medium formed from fibrous material 2 with extended usage duration of the filter medium.

LIST OF REFERENCE SIGNS

1 filter housing
2 fibrous material 3 cover
4 partition plate
5 prechamber
6 filter chamber
7 bottom plate
8 suction opening
9 pipe piece
10 attachment flange
11 passage openings
12 apertures
13 spacers
14 inlet openings
15 closure device

The invention claimed is:

1. A filter device comprising:
a filter housing including a cylindrical sidewall, an open top end of the cylindrical sidewall, a bottom plate closing a bottom end of the cylindrical sidewall, the bottom plate defining a suction opening, and a removable cover closing the open top end of the cylindrical sidewall, the removable cover defining a plurality of inlet openings for allowing water surrounding an exterior of the filter housing to flow into an interior within the filter housing;
a partition plate that is substantially flat and that defines a plurality of flow passages in at least an edge area and in a center area of the partition plate being disposed within the filter housing for dividing the interior of the filter housing into:
a filter chamber located above the partition plate and below the removable cover, and
a suction-side pre-chamber located below the partition plate and above the bottom plate,
wherein the suction-side pre-chamber is a cylindrical chamber and has a cross-sectional area that is wider in comparison to a cross-sectional area of the suction opening or the suction-side pre-chamber has a cross-sectional area that widens in a direction from the suction opening to the partition plate;
filter media formed of a fibrous material filling the filter chamber, wherein no filter media is arranged in the suction-side pre-chamber; and
a tubular outlet fitting connected to and extending downwardly from the bottom plate, the tubular outlet fitting having an internal bore that is axially aligned with and opens into the suction opening, wherein a cross-sectional area of the internal bore of the tubular outlet fitting is equal to the cross-sectional area of the suction opening, and wherein an exterior surface of the tubular outlet fitting is threaded to permit connection of the suction opening to a suction side of a pump,
wherein the suction-side pre-chamber is configured so that a suction force applied to the suction opening applies a suction force to the plurality of inlet openings.

2. The filter device according to claim 1, wherein the partition plate forms a cover surface, which is provided with passage openings, for a pipe piece which opens into the suction opening and traverses the suction-side pre-chamber, wherein the pipe piece is supported on the bottom plate, and a lateral surface of the pipe piece has apertures opening into the suction-side pre-chamber.

3. The filter device according to claim 1, wherein the filter housing is embodied as cylindrical, and the partition plate is embodied as an insert disk that divides the filter housing into the suction-side pre-chamber and the filter chamber.

* * * * *